United States Patent
Rajan et al.

(10) Patent No.: US 9,594,730 B2
(45) Date of Patent: Mar. 14, 2017

(54) ANNOTATING HTML SEGMENTS WITH FUNCTIONAL LABELS

(75) Inventors: Suju Rajan, Sunnyvale, CA (US); Scott J. Gaffney, Sunnyvale, CA (US); Kunal Punera, San Francisco, CA (US)

(73) Assignee: YAHOO! INC., Sunnyvale, CA (US)

( * ) Notice: Subject to any disclaimer, the term of this patent is extended or adjusted under 35 U.S.C. 154(b) by 955 days.

(21) Appl. No.: 12/829,265

(22) Filed: Jul. 1, 2010

(65) Prior Publication Data

US 2012/0005686 A1    Jan. 5, 2012

(51) Int. Cl.
  G06F 17/00    (2006.01)
  G06F 17/22    (2006.01)

(52) U.S. Cl.
  CPC ............................. G06F 17/2241 (2013.01)

(58) Field of Classification Search
  CPC ............... G06Q 30/02; G06Q 30/0241; G06F 17/30873; G06F 3/04886; G06F 17/2241
  See application file for complete search history.

(56) References Cited

U.S. PATENT DOCUMENTS

| | | | |
|---|---|---|---|
| 6,300,947 B1 | 10/2001 | Kanevsky | |
| 6,556,217 B1 | 4/2003 | Makipaaa et al. | |
| 7,065,707 B2 | 6/2006 | Chen et al. | |
| 7,783,642 B1 | 8/2010 | Feng et al. | |
| 7,853,871 B2 | 12/2010 | Simons et al. | |
| 7,895,148 B2 * | 2/2011 | Ma et al. | 706/55 |
| 7,900,149 B2 | 3/2011 | Hatcher et al. | |
| 2002/0016801 A1 | 2/2002 | Reiley et al. | |
| 2002/0099739 A1 | 7/2002 | Fischer | |
| 2003/0050931 A1 | 3/2003 | Harman et al. | |
| 2003/0236917 A1 | 12/2003 | Gibbs et al. | |
| 2004/0095400 A1 | 5/2004 | Anderson et al. | |
| 2004/0103371 A1 | 5/2004 | Chen et al. | |
| 2005/0195221 A1 | 9/2005 | Berger et al. | |

(Continued)

OTHER PUBLICATIONS

Alex Spengler and Patrick Gallinari, Learning to Extract Content from News Webpages, May 26-29, 2009 International Conference on Advanced Information Networking and Applications, IEEE, multipule pages (Laboratoire d'Informatique, Universit'e Pierre et Marie Curie, Paris, France).*

(Continued)

Primary Examiner — Kyle Stork
(74) Attorney, Agent, or Firm — Hickman Palermo Becker Bingham LLP

(57) ABSTRACT

A method and apparatus is described for assigning functional labels to segments of web pages in an application-independent way. In the approach described herein, one of a generic set functional labels are automatically assigned to each segment of a web page, where the generic functional labels may be topic-independent and application-independent. Applications with different needs can determine which segments of the web page to process based on which functional labels correspond to the types of information needed by each application. Thus, the work of classifying the function of each segment of a web page is separated from the work of selecting which segments satisfy the need of a particular application. The work of classification can be performed in an application-independent way, relieving the burden from every application developer from having to create their own classifiers.

20 Claims, 4 Drawing Sheets

(56) References Cited

U.S. PATENT DOCUMENTS

| | | | |
|---|---|---|---|
| 2005/0289121 A1* | 12/2005 | Nakamura | ........ G06F 17/30905 |
| 2006/0149726 A1 | 7/2006 | Ziegert et al. | |
| 2006/0230100 A1 | 10/2006 | Shin et al. | |
| 2006/0282758 A1 | 12/2006 | Simons et al. | |
| 2007/0083810 A1 | 4/2007 | Scott et al. | |
| 2008/0059453 A1* | 3/2008 | Laderman | ........................ 707/5 |
| 2008/0094420 A1 | 4/2008 | Giegel et al. | |
| 2008/0177640 A1* | 7/2008 | Gokturk et al. | ................ 705/27 |
| 2008/0235041 A1* | 9/2008 | Cashdollar et al. | .............. 705/1 |
| 2008/0307328 A1 | 12/2008 | Hatcher et al. | |
| 2010/0312728 A1 | 12/2010 | Feng et al. | |
| 2011/0307323 A1* | 12/2011 | Kuhn et al. | ................ 705/14.42 |

OTHER PUBLICATIONS

Shian-Hua Lin and Jan-Ming Ho, Discovering Informative Content Blocks from Web Documents, Jul. 23-26, SIGKDD '01 International Conference on Knowledge Discovery and Data Mining, ACM, abstract (Institute of Information Science, Academia Sinica, Nankang, Taipei 115, Taiwan).*

Vadrevu, Srinivas, et al., "Semantic Partitioning of Web Pages", Springer Verlag Heidelberg, 2005, 12 pages.

Chen, Jinlin, et al., "Function based Object Model Towards Website Adaption", Microsoft Research China, WWW10, May 2001, ACM, 13 pages.

Zou, Jie, et al., "Combining DOM Tree and Geometric Layout Analysis for Online Medical Journal Article Segmentation", ACM, JCDL, 2006, 10 pages.

Baluja, Shumeet, "Browsing on Small Screens: Recasting Web-Page Segmentation into an Efficient Machine Learning Framework", International World Wide Web Conference Committee, 2006, 10 pages.

Cai, Deng et al., "VIPS: A Vision-based Page Segmentation Algorithm", Microsoft Corporation, Nov. 2003, Technical Report MSR-TR-2003-79, 29 pages.

Kao, Hung-Yu, et al., "WISDOM: Web Intrapage Informative Structure Mining Based on Document Object Model", IEEE Transactions on Knowledge and Data Engineering, vol. 17, No. 5, May 2005, 14 pages.

Vieira, Karane, et al. "A Fast and Robust Method for Web Page Template Detection and Removal", CIKM, Nov. 5-11, 2006, 10 pages.

Kushmerick, Nicholas, "Learning to Remove Internet Advertisements", Department of Computer Science, University College Dublin, ACM, 1999, 7 Pages.

Song, Ruihua et al., "Learning Block Importance Models for Web Pages", Department of Computer Science, University of Toronto, Toronto, Canada, ACM, May 17-22, 2004, 9 pages.

Kohlschutter, Christian et al., "A Densitometric Approach to Web Page Segmentation", Leibniz University Hannover Germany, CIKM, Oct. 26-30, 2008. 10 Pages.

Fernandes, David et al., "Computing Block Importance for Searching on Web Sites", University of Minas Gerais Belo Horizonte, Brazil, CIKM, Nov. 6-8, 2007, 9 pages.

Yi, et al., "Eliminating Noisy Information in Web pages for Data Mining", School of Computing, National University of Singapore, SIGKDD, Aug. 24-27, 2003. 10 pages.

Wang, Yu et al., "Incremental Web Page Template Detection", Institute of Computing Technology, Chinese Academy of Sciences, China, ACM, Apr. 21-25, 2008, 12 pages.

Chakrabarti, Deepayan et al., "Page-level Template Detection via Isotonic Smoothing", Session: Identifying Structure in Web Pages, Yahoo Research, World Wide Web Conference Committee, May 8-12, 2007. 10 Pages.

U.S. Appl. No. 11/971,160, filed Jan. 8, 2008, Office Action, Sep. 29, 2011.

U.S. Appl. No. 11/971,160, filed Jan. 8, 2008, Final Office Action, Feb. 24, 2012.

U.S. Appl. No. 11/971,160, filed Jan. 8, 2008, Notice of Allowance, Apr. 30, 2012.

\* cited by examiner

ANNOTATING HTML SEGMENTS WITH FUNCTIONAL LABELS

CROSS-REFERENCE TO RELATED APPLICATIONS

This application is related to U.S. patent application Ser. No. 11/971,160 entitled "Automatic Visual Segmentation of WebPages" filed Jan. 8, 2008, the entire contents of which is hereby incorporated by reference as if fully set forth herein.

FIELD OF THE INVENTION

Embodiments of the invention relate to web page segmentation in general. More specifically, embodiments of the invention relate to assigning functional labels to web page segments based on visual and structural features of a web page.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web pages form the core input dataset for all Internet search and advertising companies, and this necessitates the development of algorithms for the proper analysis of web pages. Understanding the structure and content of a web page is useful in a variety of contexts.

A basic problem for an Internet application that automatically processes the content of web pages is determining which portion(s) of a web page have content that is meaningful to the application, and which to disregard. For example, a search engine automatically determines which web pages best match a user query. The basic premise of all search engines today is that a web page that contains all (or most) of the terms specified in a query string is a good candidate as an answer to the search query. However, when textual content that matches terms in a query is located in certain portions of a web page such as in an advertisement or copyright notice, the web page is not necessarily relevant to the user's search. Consider, for instance, a web page containing lyrics of a song X, but with links at the bottom of the page to other pages containing fragments from lyrics of other popular songs Y and Z. A search query for Y and Z will match this page, since both Y and Z are mentioned on the page; clearly, however, the page does not contain the information the user is looking for. Similarly, Y and Z may be text in the advertisements appearing on the web page. In another instance, a search for "copyright for company X" ought to return the main legal web page in the website for company X, and not every page in that website that has a small "copyright" disclaimer at the bottom.

HTML Includes Presentation Specification

The World Wide Web, often abbreviated "www" or simply referred to as just "the web," is an Internet service that organizes information through the use of hypermedia. Various markup languages such as, for example, the HyperText Markup Language ("HTML") or the "eXtensible Markup Language ("XML"), are typically used to specify the content and presentation of hypermedia documents (e.g., web pages). In this context, a markup language document may be a file that contains source code for a particular web page. Typically, a markup language document includes one or more pre-defined tags with content either enclosed between the tags or included as an attribute of the tags.

Automatic Classification Systems

There are at least two different ways of analyzing segments of a web page to determine a category for the segment based on the features. One method of classifying portions of documents is rule-based. A rule-based method utilizes a set of rules, typically written by a human, that encode knowledge about the relationships between features and categories. For example, a rule might specify that if a segment has both feature A and feature B, then assign a category of W to the segment. Such rules may be effective in identifying features in a small sample of pages, for example, hundreds of thousands of pages. However, it is difficult to formulate a set of rules to cover all of the structures of information found in large samples of pages, for example, hundreds of millions of pages. Thus, a rule-based system may extract accurate information from a small number of related documents conforming to a structure assumed by the rules, but generally fails to extract accurate information from a variety of web pages with varying structures. For example, all of the pages within a particular web site might conform to the same look and feel format, and rules can be written assuming that format. However, those rules would only be accurate when run against web pages on that particular web site, and would not necessarily produce accurate results for other, non-conforming pages.

Another method of automatically assigning a category based on web-based features is a machine-learning model. A machine-learning model uses machine-learning principles to learn the characteristics (features) of a set of documents that are correlated with a set of annotations in the training data. Human editors annotate the web pages in a training data set and provide these annotated web pages as input to a machine-learning mechanism. The machine-learning mechanism analyzes the training data to learn which features in the web page best correlate with the human's choice of annotation. The result is a model that associates web page features with categories.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
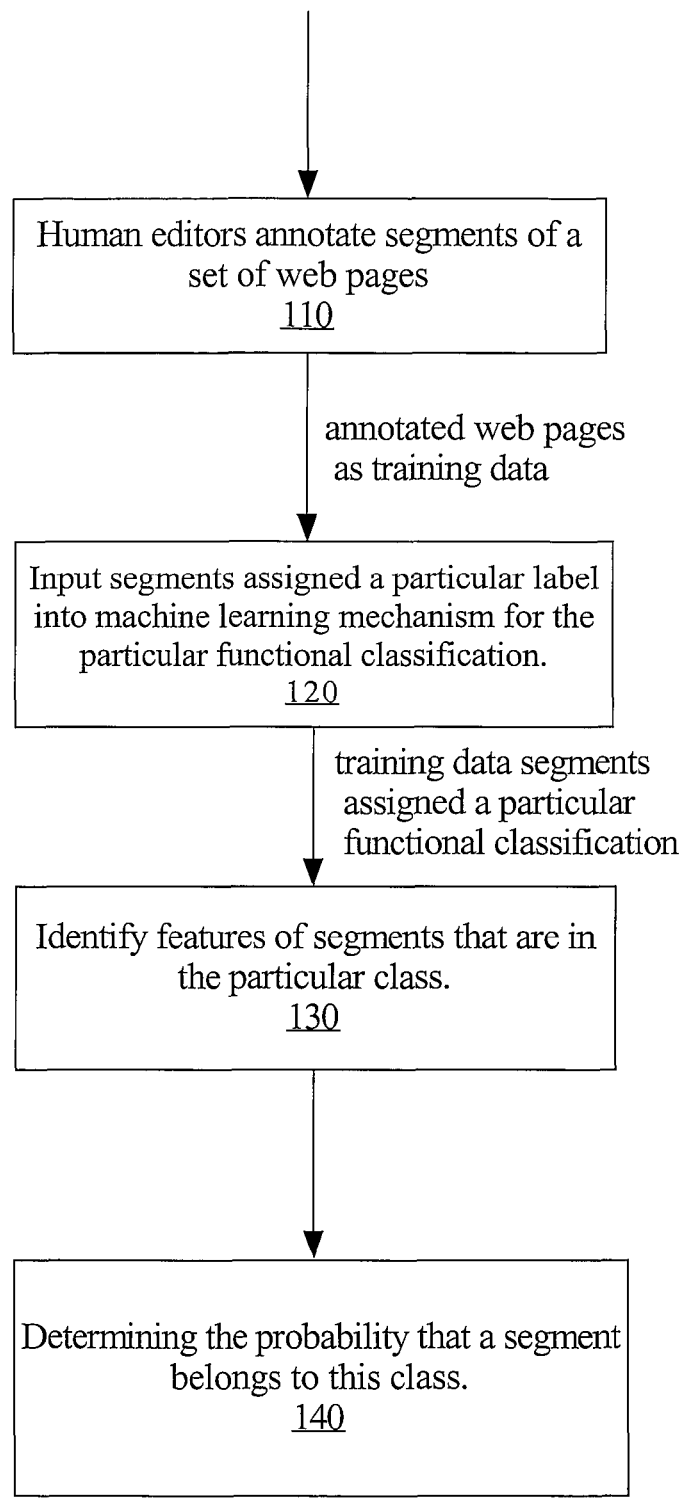
FIG. 1 is a flow diagram showing the steps to train a machine-learning mechanism to become a functional classifier of web page segments in one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

HTML pages found on the web differ widely in their functional structure. However, most pages can be decomposed into a set of functional segments. Once a web page is segmented into functional segments, a rule-based or a machine-learned solution may be employed to assign functional classification labels to each segment. Such a solution automatically takes in each such page segment as input, and assigns a functional label of the type listed below. Functional labels do not pre-suppose the utility of a segment to downstream applications, but rather merely provide additional information about the role of a segment on the page. Downstream applications can then look at the functional labels associated with each segment and either choose to process the text in such a segment or ignore the text in the segment based on the specific needs of the application.

Many different kinds of applications automatically process the content of web pages. Applications that make the simplifying assumption that all text found on a web page is equally relevant to the goal of the application may experience disappointing results. Not all text on a web page serves the same function, and thus, not all text is equally useful to an application processing (analyzing) the text on a web page. One approach to address this issue is to analyze web pages in order to distinguish the main content of the web page from other text that is not part of the main content. However, this approach only works for the set of applications whose only interest is in the main content of the web page. This approach does not distinguish among the different functions performed by the segments that are not main content because such distinction is irrelevant to this set of applications. A different approach is needed for other applications that are not primarily interested in the main content of a web page or whose interests include only particular segment types in addition to the main content.

Described herein is a set of generic functional category labels and a way to identify the functional role that text plays on a web page. There may be a significant benefit to decoupling the analysis and classification of portions of a web page from selecting and filtering the use of text contained within those classified portions. Analysis and classification can be application-independent whereas selecting and filtering may be application-specific. Each application need not provide its own analysis and classification methods, and may be able to share an implementation of these functions across applications. By annotating the function of each segment of a web page, each individual application can select the segments having the labels that correspond to content that is meaningful to the application.

Each of the segment types plays a functional role within the web page. The following segment types are characterized as examples, but do not limit the kinds of segments that can be classified on a web page:

Main content: The main content usually contains the most text that is relevant to the topic of the web page. When users perform a web search, the keywords are intended to match the text in the main content. Main content is usually located in the middle of the page and can be recognized by HTML tags that specify a long and fat text box containing a large fraction of the total number of text sentences and the use of a variety of font types.

User-generated content: User-generated content is a segment of data that is authored by a user other than the web page's initial author. It may include content such as user comments on web-pages, forum posts, posts on message/discussion boards, and user product and service reviews and ratings. The user generated content is obtained from users interacting with the web page such as typing text into a text box which then is added as content into the web page rather than provided by the initial author of the web page. User-generated content is often found at the bottom of the page. User comments, in particular, may be recognized by HTML tags that specify repeated elements with identical layout and format for each element but with different content. Each element of the repeated elements tends to contain short snippets of text, and few font types are used.

Site Navigation: Site navigation links are contained within a segment that provides the user with an overview of how the content within the web site is structured. For example, a site navigation segment for an online newspaper may contain tabs or links for "Sports," "World News," "Local News," "Obituaries," "Classified Ads," etc. The links within a Site Navigation segment point to content within the web site. A site navigation segment is usually located across the top of the page or in a left or right margin, and may be recognized by HTML tags that specify a long, skinny text box and the use of few font types. Also, the content within a navigation link segment tends to have a high ratio of hyperlinks relative to the amount of text.

Advertisements: Advertisement segments are usually comprised of a graphical display or a text box containing hyperlinks to an advertiser's web site. Advertisements may be anywhere on the page, but are often found in a header banner, in a right margin, or at the bottom of the page. Advertisements may be recognized by containing little text in relation to the page and a high ratio of links to text. Ads tend to appear in short and skinny boxes, and each advertisement may be unique content within a set of repeated elements with the same layout and format.

Boiler-plate: A boiler-plate segment only contains elements that are page-independent (i.e., they appear on all web-sites or a majority of the pages on a particular site) and often provide general information or provide procedures for general functionality. For example, site branding, a segment with only Home, Login, Contact Us buttons, privacy policy statements, disclaimers, copyrights, other legal disclosures, submit buttons, all generic fill-in forms, search boxes, or any other standard functionality or information. Boiler-plate segments are often located at the bottom of the page and may be recognized by HTML tags that specify the use of short and fat text boxes, the presences of user input forms, and the use of standard words across sites such as "Contact," "Copyright," and "Careers."

Content pointers: A content pointer segment contains pointers to content that may or may not reside within the same web site. Unlike the Site Navigation segment, a content pointer segment offers no help to the user for understanding the structure of the web site.

Analysis Framework

As mentioned above, the analysis framework may be comprised of a set of human-authored rules or a machine-learning mechanism that uses training data to learn the correlation between web page features and a conclusion about the relevance or importance of a web page segment with those features. A machine-learning mechanism may be used with training data supplied by users or authors. In some approaches, end users provide training data to indicate which parts of a set of web pages are important to them. In other approaches, web page authors annotate web pages to indicate which portions are intended to be important. Independent of who provides the training data, the machine-learning mechanism learns to distinguish important from unimportant content from a single point of view. That is, the learning mechanism is trained to find the same types of information to be important, and thus, these approaches are only useful to applications whose interest in content matches what the trainers consider to be important. Furthermore, the unimportant portions of the web page are simply filtered out.

For the approach described herein, each segment is given a functional category, and not simply designated as important or unimportant. In one embodiment, a rule-based system may be used for assigning labels to web page segments. In another embodiment, a machine-learning mechanism may be used to create classifier modules that recognize the features associated with a particular category label. Users annotate web pages with corresponding functional category labels, and these annotations are used as training data.

Topical Vs. Functional Classification

When a search engine indexes web pages, the process involves associating web pages with certain search terms or keywords that users may specify in a search query to locate these pages. The indexing process requires automatic topical classification of web pages based on the topic of the content contained within the web page. A topical category indicates what the web page is about (e.g. analogous to a Dewey decimal number or subject headings assigned to a library book). In addition, the topical category is assigned to a web page as a whole, not to individual segments, portions, or components of a web page (just as a catalog number is assigned to an entire book; the table of contents and index, for example, are not assigned different catalog numbers).

In contrast, a functional category as used herein is applied to individual segments of a web page, with different segments within the same web page having potentially different functional categories. Functional labels indicate the role or purpose that various parts of the web page serve. A web page may have a main content area, but also include a header, navigation links, search textbox, advertisements, user input forms, etc. Each of these components may be identified as to their function independent of the topic of the web page. For example, a search textbox can be identified as being within in a boiler-plate segment independent of whether the web page on which the search textbox appears is about sports, news, finance, entertainment, etc.

Segment Features

The predominant feature of text on a web page that is extracted for use in topical classification is the frequency of occurrences of certain terms that appear in the text. These terms are then correlated with search keywords. However, the features of a web page segment used to assign a functional category are different from those used to assign a topical category. As mentioned earlier, HTML elements and attributes define both content type and presentation layout. Whereas topical classification relies on features related to content type elements, functional classification may rely on presentation information. When a web page is initially partitioned into segments, the presentation features in the HTML elements and attributes associated with each segment are extracted and stored as metadata associated with each segment. Here are some examples of features that can be extracted and later correlated with functional categories. Also included in the table are some heuristics for establishing a correlation between feature metadata and a functional category:

TABLE 1

Segment features for functional category and heuristics that use the features.

| Feature | Heuristic |
| --- | --- |
| Number of hyperlinks | Many links may indicate site navigation or content pointers. |
| Location of segment as displayed on the screen (top, bottom, middle, left side, right side) | Center may be main content. Top or sides may be site navigation, bottom is typically user-generated content and/or boiler-plate information |
| Color | Different sections of the page typically have a different background color to enable the user to distinguish between the sections. Thus, two adjacent sections with different colors may be assigned different labels |
| Color contrast: highlight or blended | Same as above |
| Amount of text | Much text may be main content, little text may be advertisement. Short snippets of text within a section can be content pointers or user-generated content. |
| Ratio of hyperlinks to text | High ratios of hyperlinks to text are typically site navigation, boiler-plate or advertisements. |
| Height and length of text box | Long and skinny text boxes are typically navigation links. Short and fat text boxes are typically boiler plate. Short and skinny are advertisement segments. Main content text boxes are typically long and fat. |
| User input forms | Presence of user input forms such as search-boxes, radio buttons, submit buttons, password-login fields are typical of boiler plate segments. |
| Boiler Plate and Advertisement Phrases | Words in the boiler plate segment tend to be fairly standard across multiple sites and can be a useful feature to detect such segments. For example, Privacy Policy, Contact, Disclaimer, Restrictions, Copyright, Legal, Careers etc. Similarly, phrases such as Advertisement, Sponsored Links, Sponsored Results etc. are typical of Advertisement segments, |
| Fraction of sentences | Segments that have a small fraction of the total number of sentences are typically not main-content or user-generated content |
| Average number of Font Types | Main content typically uses different font types for instance, headline, bylines, emphasis, italics, bold etc. Font types within a navigation, boiler plate, or user comments typically are fewer. |
| HTML element type(s) | A cluster of DOM elements that repeat multiple times indicate a section with identical layout and format but most likely with content that can vary. This is typical of a segment consisting entirely of site navigation or user-generated content. |

Machine-Learning Functional Classifications

FIG. 1 is a flow diagram that shows steps for training a model that will functionally classify segments when machine-learning approaches are used. In Step 110, human editors explicitly label web page segments to create training data. Each segment occupies less than the whole web page. As an example, a user may assign a category label such "main content", "user-generated content", "advertisements", "boiler-plate", "content pointers", etc. to each segment of a web page. A web page may contain multiple different functional segments. Each segment is associated with metadata that includes a feature vector that describes features of the segment, such as the features described in Table 1 above. The classification function is learned by correlating the feature vectors with their functional category label.

Figure 2:
FIG. 2 is an example web page showing sample user markup that may be used as training data.

An example of a web page annotated as training data is shown in FIG. 2. In FIG. 2, the Advertisement 210 is a solicitation for donations to Riley's Place at the top left corner of the page. Site Navigation links 220 are found in a vertical alignment on the left side of the page. The main content 230 is in the middle of the page and describes what Riley's Place is. The Links to Donor's Web Sites, classified as content pointers 240, are in a smaller font on the right margin of the page, and a Boiler-plate 250 on the bottom left is used to indicate that Riley's Place is also on Facebook.

In Step 120 of FIG. 1, a machine-learning module for each segment type is generated by analyzing all of the training data segments that have been classified with the same segment type. In Step 130, features that are relevant to the presentation of the segments on the screen are extracted into a feature vector and correlated with the functional category. As a result of running the machine-learning mechanism, a model is built in Step 140 for each functional category type. A classifier takes a segment and a set of segment features as input and outputs a probability that the segment with these features should be classified as the particular type. The set of classifiers for each of the segment types comprise the analysis framework.

Segmentation

Once the analysis framework has been created, the system is ready to analyze web pages that are requested by an application. The first step in the analysis of an individual web page is to break the web page into segments. Several different kinds of segmentation processes may be used. Document Object Model (DOM)-based segmentation constructs a DOM tree from the web page and works to group each of the nodes in the DOM tree into a segment. Some DOM-based approaches have an optimal number of segments per page, and approaches with an optimal number of segments attempt to consolidate segments until the optimal number of segments is reached. Location-based segmentation defines regions of a web page such as top, middle, bottom, left, and right and uses presentation information in HTML tag attributes to group together portions of the web page that appear in close proximity within one of these regions. Vision-based segmentation breaks the web page down into segments based on organizing HTML tags such as <TABLE>, <DIV>, <br>, <ul>, <H>, <p>, etc.

The approach described herein for assigning functional category labels is performed at the segment level. In one embodiment of the invention, segments are identified using DOM-based segmentation. In another embodiment, segments are identified using location-based segmentation. In yet another embodiment, segments are identified using vision-based segmentation. The classification method is independent of the segmentation method, provided that the analysis framework is trained using the same segmentation method as is used in operation when an application requests a web page.

Using Application-Independent Functional Labels

Figure 3:
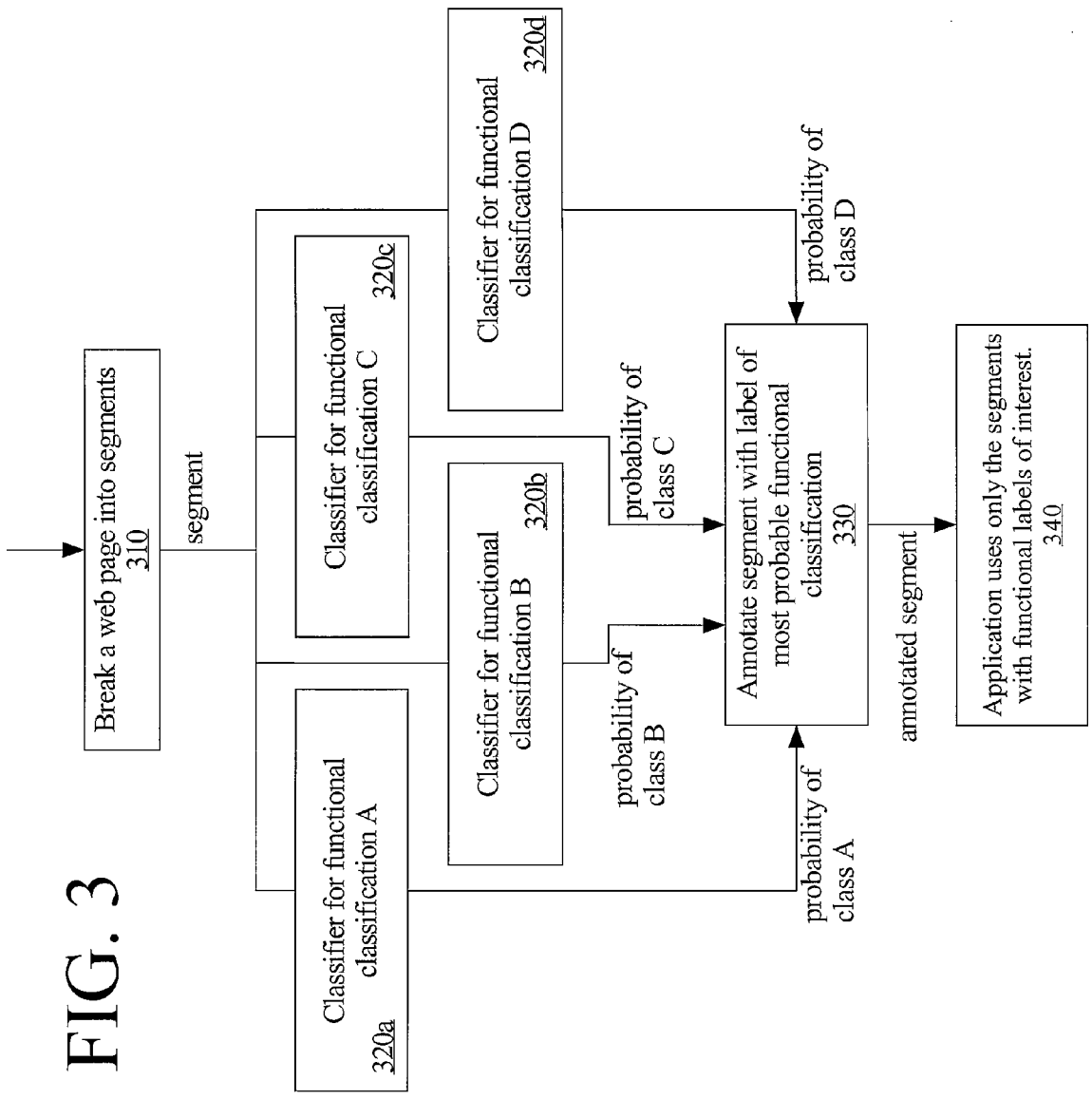
FIG. 3 is a flow diagram showing the steps of determining a functional category for segments of a web page to be processed by an application in one embodiment of the invention.

FIG. 3 is a flow diagram that shows an overview of steps for using the trained machine-learning model to determine the best functional label to assign to a particular segment based on the probabilities generated by each of the classifiers when analyzing the particular segment. In Step 310, a web page is separated into disjoint segments using one of the methods described above. One way to segment a web page is described in U.S. patent application Ser. No. 11/971,160. Once segmented, in Steps 320a, 320b, 320c, and 320d, each segment is processed by each of the functional classifiers that were previously trained. In one embodiment, the same segment may be analyzed by all classifiers concurrently. In another embodiment, the classifiers may analyze each segment sequentially. Each classifier outputs a probability that the segment should be assigned a particular category. For example, the classifier for functional classification A outputs the probability that the analyzed segment should be labeled with functional classification A. In Step 330, a functional category is chosen based on the probability output from each classifier. The segment is assigned the label corresponding to the chosen functional category. In Step 340, an application determines to process a web page segment if and only if the functional category label assigned to the segment indicates content that is of interest to the application. As different applications will be interested in different sets of functional categories, two different applications may choose to process differently labeled portions of the same web page.

Application Independence

There are a number of applications that may benefit from being able to automatically distinguish segment types on a web page. When such an application is under construction, the ability to configure interest in certain segment types reduces application-specific programming for recognizing and extracting only the interesting parts of a web page. What follows are some example applications that are interested in segments other than the main content of the page, and thus, these example applications would not be easily implemented using previous approaches.

Web-page classification systems: an application that performs topical classification of web pages might achieve more accurate results by ignoring boiler-plate, user-generated content, and advertisement segments but still obtain some valuable information from the segments marked up with site-navigation, pointer, and the main-content labels. Thus, previous approaches would either filter out too much by only providing main content as input or filter too little by providing segments that do not contribute to accurate topical classification.

User sentiment analysis: identifies user sentiment about a product or a piece of news. The segments of interest to a user segment analysis application may include segments classified as user-generated content.

Automatic review/rating aggregator: extracts user reviews to derive an aggregate rating. Automatic review and rating aggregators use segments classified as user-generated content.

Information Extraction: automatically extracting content from the main content can be enhanced by selecting a topic-specific extraction wrapper based on the subject matter. An extraction wrapper retrieves certain kinds of information from the main content. For example, an information extraction application may be interested in site navigation segments that provide hints as to the type of subject matter in the main content. For instance, knowing that a page has tabs for Menu, Directions, Hours, etc. provides a clue that the page is a restaurant page and that different information extraction wrappers (such as one meant for restaurants) can be used as opposed to a generic wrapper.

Automatic Sitemap Construction: for websites that do not provide an associated sitemap, a sitemap page may be automatically generated based on the links in a Site Navigation segment. However, links from a content pointer segment (has pointers to unrelated web pages) or boilerplate segments should not be used when constructing the sitemap.

Quicklinks: these links are presented on the Search Result Pages for a particular website. The query results for the query "aa.com" on the Yahoo! website provides an example of Quicklinks. To be useful, Quicklinks should be extracted only from the Site Navigation segment and not the boilerplate, advertisement, or content pointer segments.

Crawler Prioritization: Every once in a while a page and all of the links on a page ought to be refreshed in the index. A different refresh policy can be set for different portions of the page. For instance, it might be desirable to crawl the main content and site navigation links more often than content pointer links or the "boiler-plate" segments. The content pointer links and boiler-plate segments might need to be crawled as well, although perhaps not as frequently. Thus, the content pointer links and boiler-plate cannot be ignored, but they still must be distinguished from main content.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
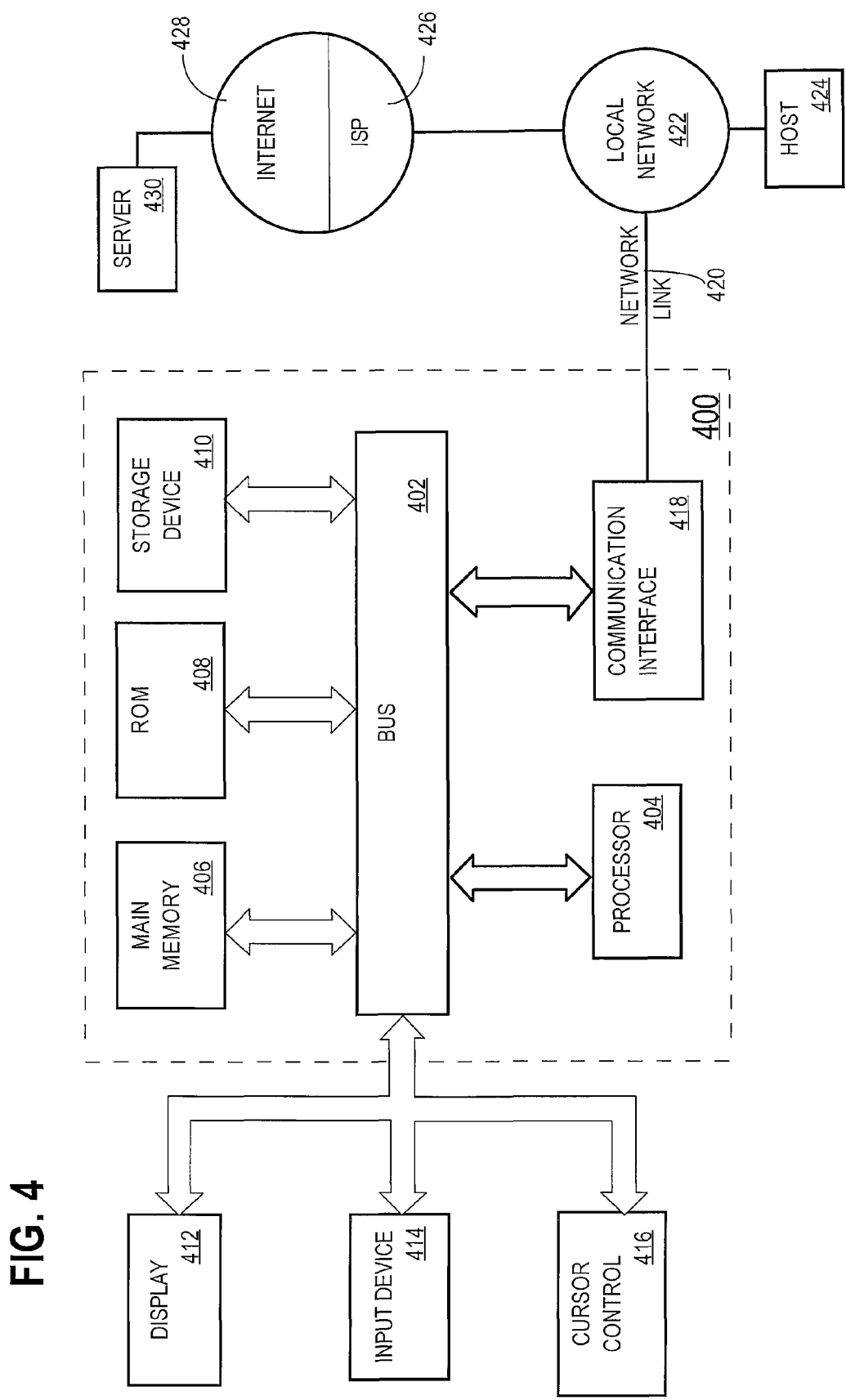
FIG. 4 is a block diagram illustrating a computer system that may be used in implementing an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
processing a web page to determine a plurality of segments, wherein each segment from the plurality of segments includes one or more HTML elements;
each machine-based classifier of a plurality of machine-based classifiers generating, based at least upon metadata associated with two or more segments from the plurality of segments that indicates one or more presentation features in the HTML elements of the two or more segments from the plurality of segments, a probability output for each segment of the two or more segments from the plurality of segments, wherein each functional category from the plurality of functional categories corresponds to a functional role of HTML elements in the web page;
wherein each machine-based classifier from the plurality of machine-based classifiers corresponds to a functional category from the plurality of functional categories;
assigning, based on the plurality of probability output, one or more functional categories to each segment of the two or more segments;
a first application selecting a first set of functional categories from the plurality of functional categories;
a second application that is different than the first application selecting a second set of functional categories from the plurality of functional categories, wherein the second set of functional categories does not include functional categories from the first set of functional categories;
the first application selecting for processing, based upon the first set of functional categories and the functional categories assigned to the two or more segments, a first set of one or more segments from the two or more segments;
the second application selecting for processing, based upon the second set of functional categories and the functional categories assigned to the two or more segments, a second set of one or more segments from the two or more segments, wherein the second set of one or more segments includes at least one segment that is not in the first set of one or more segments and the first set of one or more segments includes at least one segment that is not in the second set of one or more segments;
the first application processing content contained in the first set of one or more segments and not processing content contained in the second set of one or more segments;
the second application processing content contained in the second set of one or more segments and not processing content contained in the first set of one or more segments; and
wherein the method is performed by one or more computing devices.

2. The method of claim 1, wherein the first set of one or more segments does not include a segment assigned a main content functional category, wherein segments assigned the main content functional category contain the most text that is relevant to the topic of the web page.

3. The method of claim 1, wherein the second application indexes the web page for a search engine by ignoring the content of each segment from the two or more segments that is assigned an advertisement functional category or a site navigation functional category.

4. The method of claim 1, wherein the functional categories assigned to the two or more segments are independent of a topic of one or more topics associated with the web page.

5. The method of claim 1, wherein the plurality of functional categories includes at least one of:
a) user-generated content;
b) site navigation; or
c) boiler-plate.

6. The method of claim 1, wherein the first application determines a topic for the web page by processing the content contained in the first set of one or more segments, wherein the first set of one or more segments includes segments that are assigned a functional category of:
a) main content
b) content pointers; and
c) site navigation;

wherein the first set of one or more segments does not include segments that are assigned a functional category of
  a) advertisement; or
  b) user-generated content.

7. The method of claim 1, wherein the first application determines a topic for the web page by analyzing a frequency of words that appear as text within the first set of one or more segments; and
  wherein the frequency of words that appear as text within segments of the first set of one or more segments assigned an advertisement functional category or user-generated content functional category are not analyzed.

8. The method of claim 1, wherein the metadata associated with the two or more segments includes at least one of:
  a) amount of screen space taken to display the segment;
  b) height or width of the screen space taken to display the segment;
  c) number of hyperlinks contained within the segment;
  d) amount of text within the segment;
  e) ratio of hyperlinks to text within the segment;
  f) types of html elements contained within the segment; or
  g) color of the section and whether the color of the segment is different from the color of other segments.

9. The method of claim 1, wherein assigning one or more functional categories further comprises:
  training a machine-based classifier based on the metadata associated with the two or more segments and functional category data provided by human editors;
  the machine-based classifier improving the accuracy of functional category assignment based on regression techniques.

10. The method of claim 1, wherein the first application is a web crawler and the first set of one or more segments comprises a set of segments that are assigned a main content functional category.

11. One or more non-transitory computer-readable media storing instructions which, when processed by one or more processors, cause:
  processing a web page to determine a plurality of segments, wherein each segment from the plurality of segments includes one or more HTML elements;
  each machine-based classifier of a plurality of machine-based classifiers generating, based at least upon metadata associated with two or more segments from the plurality of segments that indicates one or more presentation features in the HTML elements of the two or more segments from the plurality of segments, a probability output for each segment of the two or more segments from the plurality of segments, wherein each functional category from the plurality of functional categories corresponds to a functional role of HTML elements in the web page;
  wherein each machine-based classifier from the plurality of machine-based classifiers corresponds to a functional category from the plurality of functional categories;
  assigning, based on the plurality of probability output, one or more functional categories to each segment of the two or more segments;
  a first application selecting a first set of functional categories from the plurality of functional categories;
  a second application that is different than the first application selecting a second set of functional categories from the plurality of functional categories, wherein the second set of functional categories does not include functional categories from the first set of functional categories;
  the first application selecting for processing, based upon the first set of functional categories and the functional categories assigned to the two or more segments, a first set of one or more segments from the two or more segments;
  the second application selecting for processing, based upon the second set of functional categories and the functional categories assigned to the two or more segments, a second set of one or more segments from the two or more segments, wherein the second set of one or more segments includes at least one segment that is not in the first set of one or more segments and the first set of one or more segments includes at least one segment that is not in the second set of one or more segments;
  the first application processing content contained in the first set of one or more segments and not processing content contained in the second set of one or more segments; and
  the second application processing content contained in the second set of one or more segments and not processing content contained in the first set of one or more segments.

12. The one or more non-transitory computer-readable media of claim 11, wherein the first set of one or more segments does not include a segment assigned a main content functional category, wherein segments assigned the main content functional category contain the most text that is relevant to the topic of the web page.

13. The one or more non-transitory computer-readable media of claim 11, wherein the second application indexes the web page for a search engine by ignoring the content of each segment from the two or more segments that is assigned an advertisement functional category or a site navigation functional category.

14. The one or more non-transitory computer-readable media of claim 11, wherein the functional categories assigned to the two or more segments are independent of a topic of one or more topics associated with the web page.

15. The one or more non-transitory computer-readable media of claim 11, wherein the plurality of functional categories includes at least one of:
  a) user-generated content;
  b) site navigation; or
  c) boiler-plate.

16. The one or more non-transitory computer-readable media of claim 11, wherein the first application determines a topic for the web page by processing the content contained in the first set of one or more segments, wherein the first set of one or more segments includes segments that are assigned a functional category of:
  a) main content
  b) content pointers; and
  c) site navigation;
  wherein the first set of one or more segments does not include segments that are assigned a functional category of
  a) advertisement; or
  b) user-generated content.

17. The one or more non-transitory computer-readable media of claim 11, wherein the first application determines a topic for the web page by analyzing a frequency of words that appear as text within the first set of one or more segments; and wherein the frequency of words that appear as text within segments of the first set of one or more segments assigned an advertisement functional category or user-generated content functional category are not analyzed.

18. The one or more non-transitory computer-readable media of claim 11, wherein the metadata associated with the two or more segments includes at least one of:
   a) amount of screen space taken to display the segment;
   b) height or width of the screen space taken to display the segment;
   c) number of hyperlinks contained within the segment;
   d) amount of text within the segment;
   e) ratio of hyperlinks to text within the segment;
   f) types of html elements contained within the segment; or
   g) color of the section and whether the color of the segment is different from the color of other segments.

19. The one or more non-transitory computer-readable media of claim 11, wherein assigning one or more functional categories further comprises:
   training a machine-based classifier based on the metadata associated with the two or more segments and functional category data provided by human editors;
   the machine-based classifier improving the accuracy of functional category assignment based on regression techniques.

20. The one or more non-transitory computer-readable media of claim 11, wherein the first application is a web crawler and the first set of one or more segments comprises a set of segments that are assigned a main content functional category.

* * * * *